United States Patent
Buyukkalender et al.

(10) Patent No.: US 9,104,954 B2
(45) Date of Patent: Aug. 11, 2015

(54) RADIOFREQUENCY TRANSPONDER DEVICE WITH OPTIMIZED PASSIVE RESONANT CIRCUIT

(75) Inventors: Arek Buyukkalender, Marseilles (FR); Nizar Lahoui, Aubagne (FR); Frédérick Seban, Auriol (FR)

(73) Assignee: GEMALTO SA, Meudon (FR)

( * ) Notice: Subject to any disclaimer, the term of this patent is extended or adjusted under 35 U.S.C. 154(b) by 1 day.

(21) Appl. No.: 14/118,120

(22) PCT Filed: May 15, 2012

(86) PCT No.: PCT/EP2012/059024
§ 371 (c)(1),
(2), (4) Date: Nov. 15, 2013

(87) PCT Pub. No.: WO2012/156403
PCT Pub. Date: Nov. 22, 2012

(65) Prior Publication Data
US 2014/0131453 A1 May 15, 2014

(30) Foreign Application Priority Data
May 17, 2011 (EP) .................................... 11305594

(51) Int. Cl.
*G06K 19/077* (2006.01)

(52) U.S. Cl.
CPC .... *G06K 19/07773* (2013.01); *G06K 19/07749* (2013.01); *G06K 19/07794* (2013.01)

(58) Field of Classification Search
CPC .................... G06K 19/0723; G06K 19/07773; G06K 19/07749
USPC .................................................. 235/492, 487
See application file for complete search history.

(56) References Cited

U.S. PATENT DOCUMENTS

| 5,955,723 A | 9/1999 | Reiner |
| 6,378,774 B1 | 4/2002 | Emori et al. |

(Continued)

FOREIGN PATENT DOCUMENTS

| JP | 10-293828 A1 | 11/1998 |
| JP | 2001-351084 A | 12/2001 |
| JP | 2002-150245 A | 5/2002 |

OTHER PUBLICATIONS

International Search Report (PCT/ISA/210) mailed on Jul. 25, 2012, by the European Patent Office as the International Searching Authority for International Application No. PCT/EP2012/059024.

(Continued)

*Primary Examiner* — Allyson Trail
(74) *Attorney, Agent, or Firm* — Buchanan Ingersoll & Rooney PC

(57) ABSTRACT

The invention relates to a radiofrequency device comprising a passive antenna tuned or intended to be tuned in frequency with at least one transponder, said transponder comprising an integrated circuit chip linked to an antenna interface defining an electromagnetic coupling surface periphery, said passive antenna comprising a main loop formed of turns comprising at least one portion of surface (B) inside the loop, at least one recess of the main loop, oriented from the interior to the exterior of the main loop, said portion of surface (B) being located in said recess so as to effect an electromagnetic coupling with a transponder circuit; the device is distinguished in that it comprises two recesses receiving or intended to receive a transponder each.

14 Claims, 2 Drawing Sheets

(56) References Cited

U.S. PATENT DOCUMENTS

2011/0063184 A1 3/2011 Furumura et al.
2012/0216346 A1* 8/2012 Rampton et al. .................. 5/99.1
2014/0014732 A1* 1/2014 Finn et al. ..................... 235/492
2014/0071011 A1* 3/2014 Yosui et al. ................... 343/788
2014/0173758 A1* 6/2014 Bilbrey et al. .................. 726/29

OTHER PUBLICATIONS

Written Opinion (PCT/ISA/237) mailed on Jul. 25, 2012, by the European Patent Office as the International Searching Authority for International Application No. PCT/EP2012/059024.

* cited by examiner

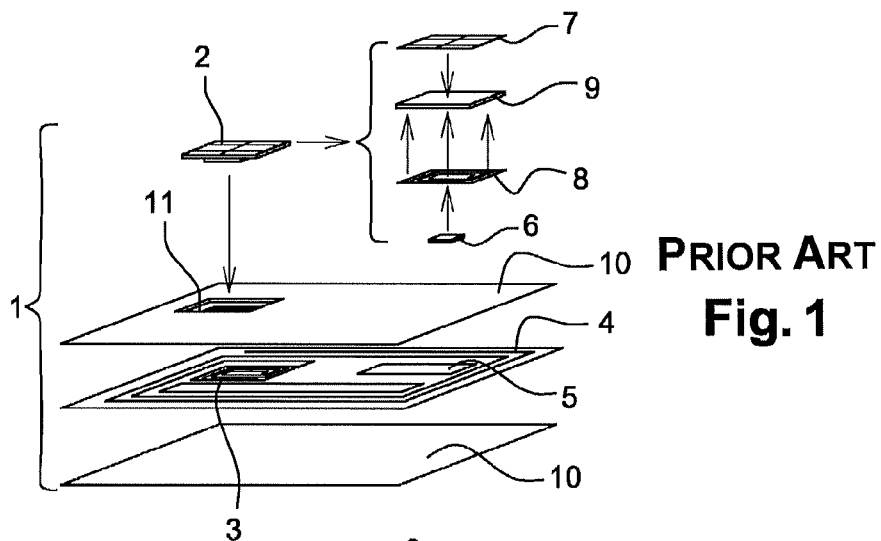
PRIOR ART
Fig. 1
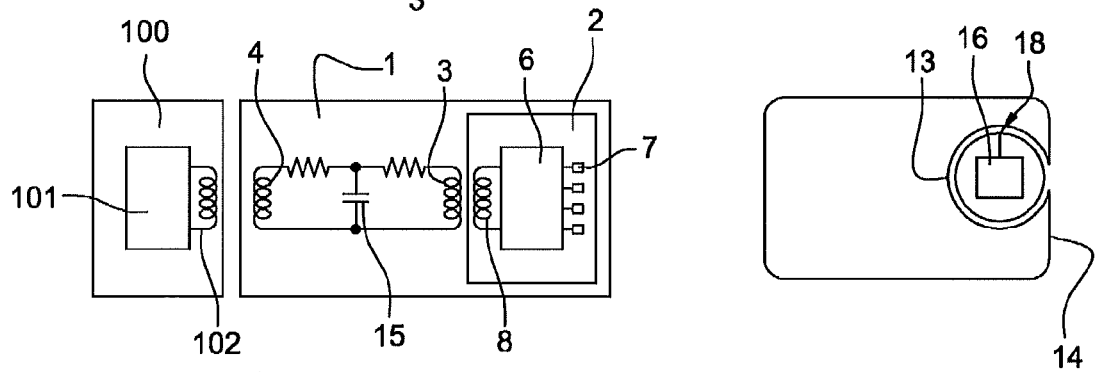
PRIOR ART
Fig. 2
PRIOR ART
Fig. 3
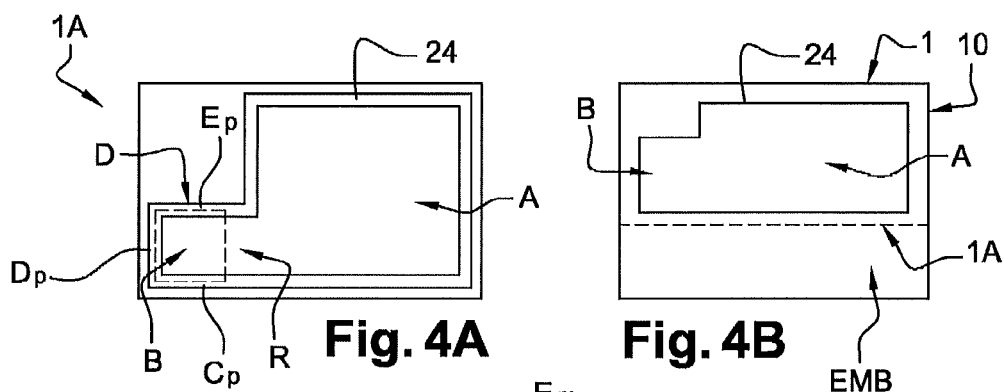
Fig. 4A
Fig. 4B
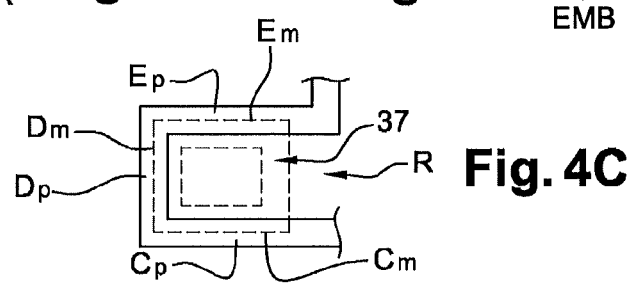
Fig. 4C

RADIOFREQUENCY TRANSPONDER DEVICE WITH OPTIMIZED PASSIVE RESONANT CIRCUIT

The invention relates to the field of passive antenna radiofrequency transponders and to the structure of such RF transponders.

More particularly, the invention relates to contactless smart cards media such as contactless smart cards, the communication of which is amplified by a passive antenna.

The invention may also concern contactless electronic travel documents systems such as electronic passports and electronic visas as transponders arranged together. In particular, these documents and visas are complying with the ICAO (acronym of "International Civil Aviation Organization") specifications and ISO/IEC 14443 standard.

Document U.S. Pat. No. 6,378,774 shown in FIGS. 1 and 2 discloses a chip card comprising an integrated circuit module 2 with contacts and antenna communication interfaces. The card body comprises a passive antenna which comprises two coils 3, 4 mounted in parallel on a capacitor, with a wide closed coil which may be positioned substantially at the periphery of the card body and a narrow coil so positioned as to be centred with the module antenna. The function of the wide coil is to communicate with an external drive and the function of the narrow loop is to couple and to communicate with the module.

These media have a drawback, with a main passive antenna having two loops in the form of a figure of eight, in that they have a complex construction.

Document U.S. Pat. No. 5,955,723 shown in FIG. 3 discloses a data medium comprising an integrated circuit 16 linked to a first conductor loop 18, with at least one second coupling surface conductive loop 14 corresponding approximately to that of the medium and a third loop 13 belonging to the second loop and having approximately the dimensions of the first loop. The first and third loops are positioned substantially concentrically and are coupled together. In one embodiment illustrated in FIG. 3, the third loop is open to the outside. It corresponds to a recessed hollow or concave portion of the first loop coming from the exterior towards the interior of the coupling surface delimited by the inner surface of the antenna 14.

The resulting medium has a drawback in that it requires a passive antenna, the main loop of which extends over the entire periphery of the medium. In addition, the described constructions do not make it possible to reach a target level of performance complying with the ISO/IEC 14443 standard.

One embodiment of the SPS (Smart Card Solutions) Company, which uses a contact and antenna module positioned in a body cavity of a bank smart card, is also known. This module is coupled to a passive antenna positioned on almost the entire surface of the card body. It comprises substantially concentric loops positioned in a spiral around the cavity of the module. The first loop adjacent to the cavity is several millimeters wide under the location of the module cavity, even 5 mm wide, and the following ones too in order to enable an embossing on the turns without the risk of cutting the turns during the embossing operation. In addition, the antenna is linked to metallic capacitor plates positioned on both sides of the antenna support. The last turn extends on the periphery of the card to cover as many radiofrequency fluxes from a reader as possible.

This construction has a drawback in that it entails a risk of delamination inasmuch as the plastic sheets forming the card body badly stick to the metal surfaces of the turns of the antenna and/or the capacitor plates.

The invention aims to solve the aforementioned drawbacks.

In particular, it aims to improve the performance of radiofrequency devices or RF transponders using a passive antenna while having a simpler construction of the passive antenna. It also aims to use a smaller metal surface for the passive antenna and/or the associated capacitor more particularly to avoid delamination and/or saving conductive surface.

To this end, the invention relates to a radiofrequency device comprising a passive antenna tuned or intended to be tuned in frequency with at least one transponder 22, 22b, said transponder comprising an integrated circuit chip 16 linked to an antenna interface 28 defining an electromagnetic coupling surface periphery P, said passive antenna comprising:

a main loop 24 formed of turns comprising at least one portion of surface B inside the loop, at least one recess R, R2 of the main loop oriented from the interior to the exterior of the main loop, with said portion of surface B being located in said recess R, R2 so as to effect an electromagnetic coupling with a transponder circuit;

the device is characterized in that it comprises two recesses R, R2 receiving or intended to receive a transponder 22, 22b each.

According to other characteristics of the device:

several turns of the passive antenna extend or are intended to extend substantially close to, and along the antenna interface 28 of the transponder (or radiofrequency module) over more than half the periphery;

said plurality of turns of the passive antenna are positioned or intended to be positioned directly above turns of said module interface;

said plurality of turns of the passive antenna extend or are intended to extend over three quarters of the module interface periphery;

said recess has the concave shape of a "U" or a "V" which is oriented towards the interior surface of the loop;

the device comprises or is intended to comprise a first transponder in a contact module open at the surface of the device and a second not open transponder;

said first transponder is complying with type A ISO/IEC 14443 standard and the second one is complying with type B;

the passive antenna extends substantially only over half of the surface of a ISO 7816 smart card; the passive antenna (24) extends outside an embossing area; the coupling surface of the passive antenna preferably extends over a surface which is about half of the surface of the ISO 7816 smart card, i.e. 81×25 mm or less;

the exterior parallel branches of the "U" are spaced by a distance between 5 mm and 15 mm;

the recess is intended to be positioned directly above a subscriber identity module (SIM) constituting a radiofrequency transponder or being of the NFC type; the device may comprise or constitute a flexible medium which may be positioned in the case of a cellular telephone in order to enhance the coupling with a radiofrequency or NFC transponder contained in the module.

Thanks to the invention:

The passive antenna pattern needs not have two closed coils, one of which is substantially concentric with the module antenna;

A good functionality of the product is obtained during the ISO 14443-2 tests thanks to the optimized coupling between the passive antenna and the module or modules;

The U-, V- or C-shaped recess (concave shape of the antenna oriented towards the inside of the antenna) enables coupling with a passive antenna with a single coil and a halved coupling surface to allow embossing on a bank card;

The invention provides good coupling with a less extensive loop and a smaller turns surface; It has the advantage of avoiding the problem of delamination while freeing the entire standard embossing area reserved for embossing;

The invention makes it possible to free the surface occupied by the antenna, so that a card can receive graphic customizing elements such as windows or transparent portions;

The invention makes it possible to rationalize the production with only one type of passive antenna for several potential applications, with the antenna comprising several substantially "U"- or "C"-shaped recesses, with the surface of each recess substantially matching the surface of each module.

Other features and advantages of the invention will become apparent upon reading the following description given by way of non-limiting example and in the accompanying drawings in which:

FIGS. 1 and 2 illustrate a dual interface smart card according to the prior art;

FIG. 3 illustrates a contactless smart card of the prior art;

FIG. 4A illustrates a schematic view of the device according to an embodiment of the invention;

FIG. 4B shows a schematic view of a smart card with the device of FIG. 4A;

FIG. 4C shows a schematic view of the recess R of FIG. 4A;

Figure 5:
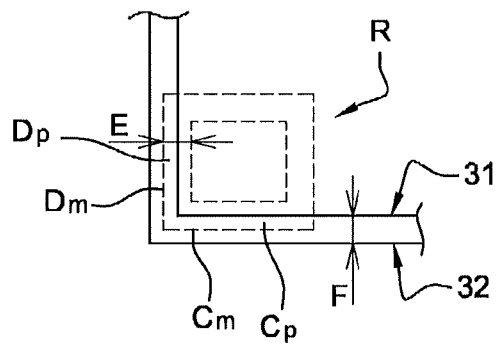
FIG. 5 illustrates a schematic view of another embodiment of the recess R of FIG. 4A.
Figure 6:
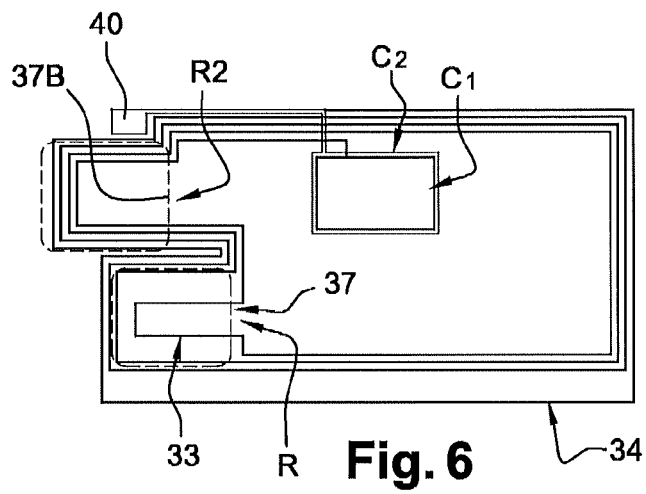
FIG. 6 illustrates a schematic view of a third embodiment of the device according to the invention.

FIGS. 1-3 of the prior art have been previously described in the introduction.

The passive antennae are referenced respectively 3, 4 and 13, 14. They respectively comprise a small loop 3, 13 and a large loop 4, 14.

In FIG. 3, the electromagnetic flux induced within the loop 14 is opposite the one induced in the loop 13 and may affect the efficiency of the electromagnetic coupling.

In FIG. 4A, a radiofrequency device 1A according to the invention is schematically shown (no frequency tuning capacity in principle linked to the antenna terminals is shown). The device is, in this example, a contactless and/or a contact smart card according to ISO 7816 and ISO/IEC 14443 standards. It can be an e-passport or any other contactless object like an electronic tag, a badge, a transport ticket, etc.

Figure 7A:
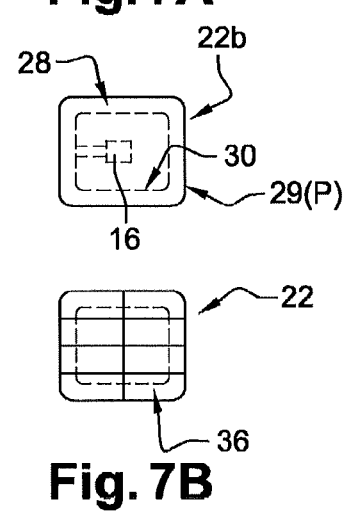
FIGS. 7A and 7B illustrate modules for an antenna interface and a transponder, respectively.
Figure 7B:
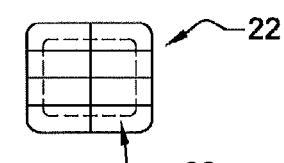

The device comprises a passive antenna 24 tuned or to be tuned in frequency with at least one radiofrequency transponder 22 or 22b. The transponder 16 comprises a radiofrequency integrated circuit chip linked to an antenna interface 28 or 36 (shown schematically here). An outer turn 29 of the antenna interface 28 defines a periphery P of the electromagnetic coupling surface of the transponder; The module also comprises an inner turn 30. The transponder may be, in the example, a dual interface module 22 (antenna and contact pads 36 on the surface of the card body) or a smart card contactless module 22b (FIG. 7B).

Generally, in the context of the present description, transponder means any radiofrequency electronic circuit communicating through an electromagnetic field and having a coil linked to a capacitor and/or an integrated circuit.

Transponders are used in various fields of the economy, such as banking (e-wallet), communication, transportation, identity (e-passport, ID-card). In the field of identity, in particular, identifying a person by radiofrequency communication with a contactless electronic portable object of the RFID type is known.

The module may comprise or not an insulating substrate carrying contact pads and/or the antenna. The passive antenna can be produced on an insulating substrate using any technique known to the persons skilled in the art including antenna wire inlay, etching, screen printing. In the example, the antenna is etched.

The passive antenna 24 comprises a single main loop formed by at least one or more turns. It comprises at least a portion of surface A within the loop to effect an electromagnetic coupling with at least one transponder circuit.

Preferably, for better results in the coupling and performances passing the ISO/IEC 14443 standard tests, several turns of the passive antenna 24 extend or are intended to extend substantially close to, and along the modules interface 28 over more than half the periphery P thereof. This means that a portion of the course of the turns of the passive antenna 24 defining the corner is closely associated and/or is substantially parallel to the path of the turns of the antenna interface 28 of the transponder over at least a distance corresponding to half the length of the peripheral turn 29 P.

In the example which relates to a smart card module, the antennas 24 and 28 are positioned adjacent to one another, for example, separated by less than one millimeter. In other devices such as USB flash drives, phone, proximity may be larger, for example of the order of a few millimeters or even one or more centimeters.

In FIG. 4B (or 4A), it can be noted that the antenna 24 extends over half the surface of a smart card body 10 having ISO 7816 dimensions. The corner portion of the passive antenna has a horizontal letter "U" or a letter "C" shape. The portion forms here a shoulder of the passive antenna 24 extending toward a location 37 of the module to integrate or to by-pass this location.

With the arrangements above, the radiofrequency communication of the card with a card reader is improved, and may conform to the ISO/IEC 14443 standard with only half the surface of an ISO 7816 standard smart card.

The electromagnetic flux induced in the surface A has the same direction as the one induced in the surface B of the recess.

The passive antenna may extend substantially over the entire length of the card or even beyond the module (on the left in the figure).

In FIG. 4C, which corresponds to an enlarged portion of the corner extracted from FIG. 4A, the corner R has the shape of the letter "C". The overlapping of the main antenna 24 and the antenna interface 28 respectively occurs on three of the adjacent perpendicular sides Cp, Dp, Ep, and Cm, Dm, Em thereof.

In this embodiment, several turns of the passive antenna extend or are intended to extend over three quarters or more of the periphery of the antenna interface 28 of the module.

Alternately, the passive antenna may surround a little more the transponder or the location 37 with a complementary portion without completely closing the surface B and isolating it from the surface A.

The passive antenna may be linked to two capacitor plates C1, C2, for example, formed on either side of the substrate of the antenna (alternately, the capacity can be achieved by an integrated circuit chip). A pad 40 fixed to both sides of the substrate enables, through the bore and the deformation thereof, to connect the two plates, themselves linked to the ends of the passive antenna.

The passive antenna may include, in the recess R, an inner turn 33 tapering toward the right bisector of the recess R or R2, or toward the interior of the location 37, 37B of the modules 22 and 22b. The advantage is that a module cavity may be machined with large manufacturing tolerances without any risk of cutting the inner turn of the antenna 24 or 34 at the corner. Several cavity dimensions can thus be provided for with the same passive antenna profile. The widening of the turn is here, in this recess only, covered by the transponder antenna.

According to other alternative embodiments, the invention provides to make series capacitors by multiplying stacked plates. These plates or grids are formed with a continuous path of a wire.

In addition, the invention provides to make stacked plates or grids on the path of antenna turns.

Thus, a series assembly of capacitors is obtained either by stacking at least three grids, or by making at least two capacitors on a path of the same turn (or a single conductive track if no antenna is provided).

For example when making a turn, the tool guiding the wire on the substrate makes a plate having a zigzag shape or any grid shape, and then the wire of a second winding or a subsequent winding of the second turn makes the second plate and/or other subsequent plates to have capacitors in series with each other.

The advantage of a series capacitor is that it increases the area devoted to the plates.

Alternately, after completing a first plate, the invention provides for the second plate or the $n^{th}$ plate to be produced immediately after the first one with a continuous wire, for example by making the wire run on the grid that has just been formed before continuing the antenna path.

The stacked grids forming the capacitor can be adjusted by cutting a wire according to the desired capacitance value. For example, if a terminal grid portion is disconnected from the circuit by cutting a wire in a location on the grid, or leading to the grid, the same capacity amount is disabled. As another example, if a grid terminal portion contains N lines crossing N other lines as in FIG. 3, the invention provides to be able to cut a wire, preferably at lines located on the edges of the grids or at a distance from the grids. The invention provides a correlation table between "N" eliminated lines and the matching removed capacitance value.

Figure 8:
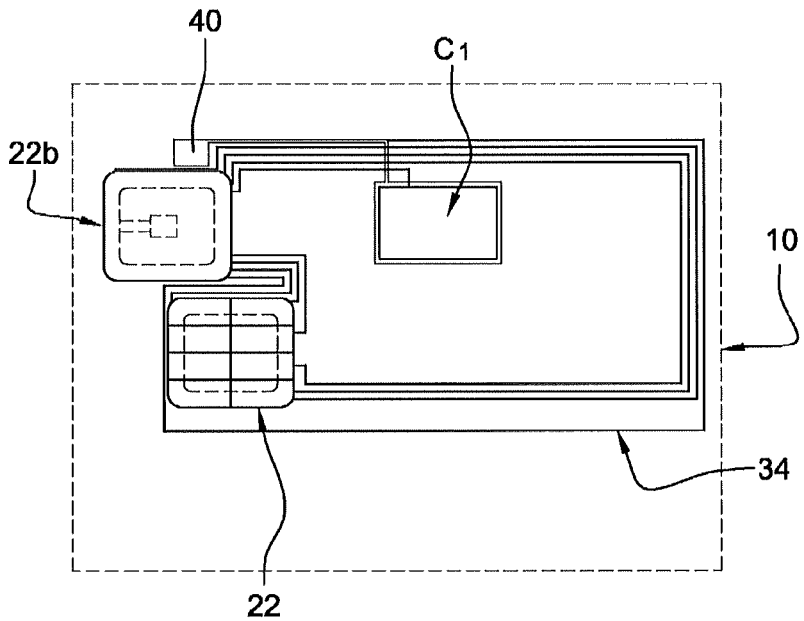
FIG. 8 illustrates a schematic view of a fourth embodiment of the device according to the invention.

The table below shows the results obtained with a passive antenna according to FIG. 8 and a module substantially complying with FIG. 7B. The module used for the tests may comply with a SPS company's standard module. These values fully meet the ISO 14443 standard with a half-surface antenna only, unlike the prior art for a passive antenna kind of product.

The invention makes it possible to obtain a universal antenna for three possible utilizations: a two-module antenna, a single-module antenna with a dual interface and a contactless module antenna. The stocks can thus be reduced and the production can be rationalized with only one type of antenna for several utilizations.

The table shows the values obtained for the high (USB) and low (LSB) sidebands. The passive antenna may be a conventionally etched antenna. It has the following characteristics:

Number of turns: 4
Inductance: 3.2 µH
Impedance: 3.1 Ohm
C: approx. 53 Pf

The invention claimed is:

1. A radiofrequency device comprising:
a passive antenna tuned or being configured to be tuned in frequency with at least one transponder,
said transponder comprising an integrated circuit chip linked to an antenna interface defining an electromagnetic coupling surface periphery,
said passive antenna comprising:
a main loop formed of turns comprising at least one portion of surface inside the loop,
at least one recess of the main loop oriented from an interior to an exterior of the main loop, with said portion of surface being located in said recess so as to effect an electromagnetic coupling with a transponder circuit, wherein the device comprises two recesses being configured to receive a transponder each.

2. A device according to claim 1, wherein several turns of the passive antenna extend or are configured to extend substantially close to, and along the antenna interface over more than half the periphery.

3. A device according to claim 1, wherein said plurality of turns of the passive antenna are positioned or configured to be positioned directly above turns of said antenna interface.

4. A device according to claim 1, wherein said plurality of turns of the passive antenna extend or are configured to extend over three quarters of the antenna interface periphery.

5. A device according to claim 1, wherein said recess has the concave shape of a "U" or a "V" or a "C" which is oriented towards the interior surface of the passive antenna.

6. A device according to claim 5, wherein the device comprises or is configured to comprise a first transponder in a contact module open at the surface of the device and a second not open transponder.

7. A device according to claim 6, wherein said first transponder complies with type A ISO/IEC 14443 standard and the second one complies with type B, or vice versa.

8. A device according to claim 1, wherein the coupling surface of the passive antenna extends over a surface which is about half of the surface of an ISO 7816 smart card.

9. A device according to claim 8, wherein the passive antenna extends outside an embossing area.

10. A device according to claim 1, wherein exterior parallel branches of the "U" are spaced by 5 mm to 15 mm.

11. A device according to claim 1, wherein the recess is configured to be positioned directly above a subscriber identity module constituting a radiofrequency or NFC type transponder.

12. A device according to claim 1, wherein the device comprises only one transponder positioned directly above one of the recesses.

13. A passive antenna comprising:
a main loop formed of a plurality of windings, and
a recess of the main loop opening from an inside of the main loop to an outside of the main loop, to receive a transponder,
wherein the passive antenna includes, in the recess, an internal turn extending towards a bisector of the recess.

14. A passive antenna comprising:
a main loop formed of a plurality of windings, and
a recess of the main loop opening from an inside of the main loop to an outside of the main loop, to receive a transponder,
wherein the passive antenna includes, in the recess, an internal turn,
wherein a width of a conductor forming the internal turn is larger than a width of conductors forming the turns of the main loop.

* * * * *